Jan. 5, 1943.    F. G. KELLY    2,307,626
RESISTANCE THERMOMETER
Filed July 23, 1940
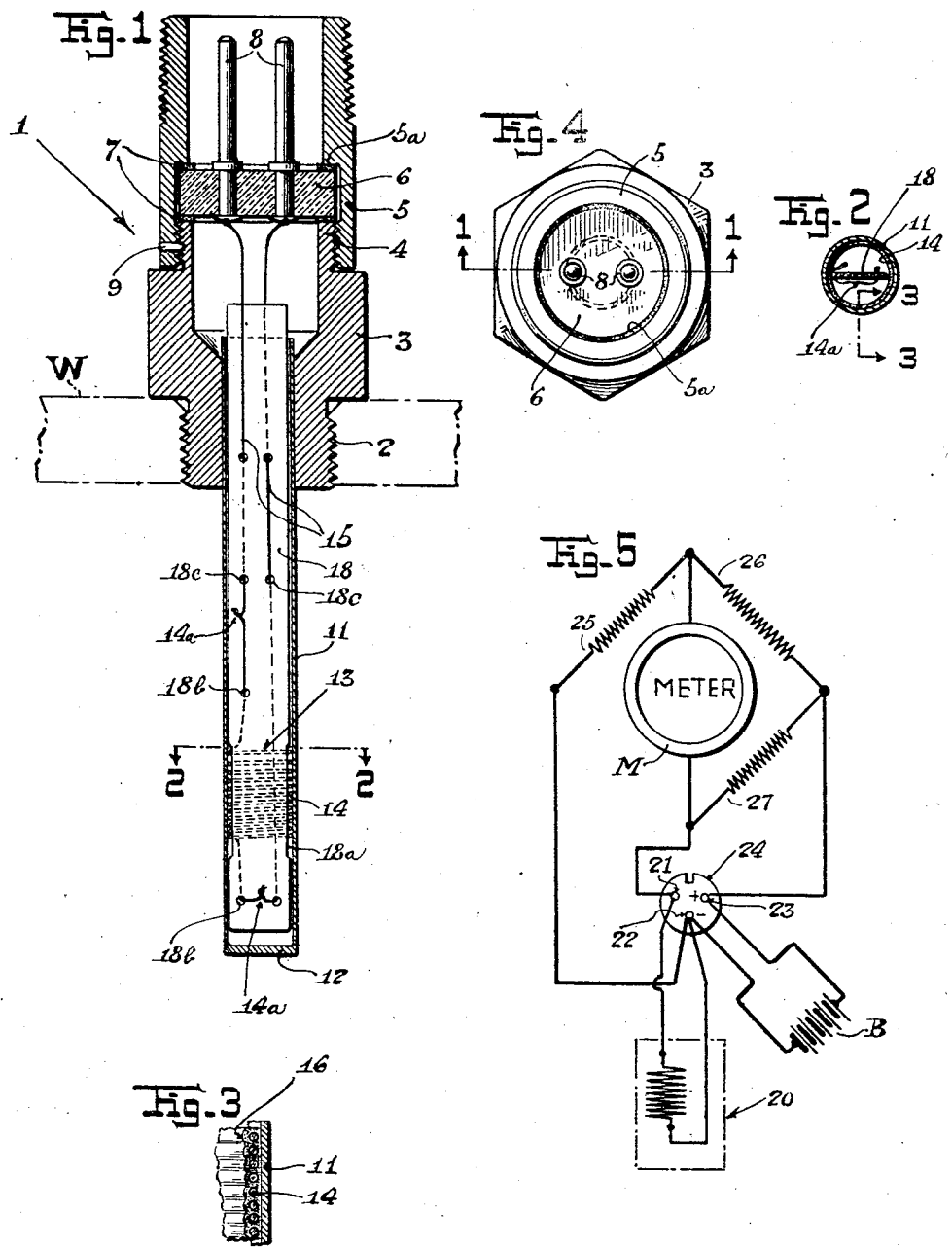
Inventor
Frederick G. Kelly
By Henry Canahan
Attorney

UNITED STATES PATENT OFFICE 2,307,626

RESISTANCE THERMOMETER

Frederick G. Kelly, West Orange, N. J., assignor to Thomas A. Edison, Incorporated, West Orange, N. J., a corporation of New Jersey Application July 23, 1940, Serial No. 346,892

8 Claims. (Cl. 201—63)

This invention relates to resistance thermometers, and more particularly to the resistor bulbs thereof which are adapted to be immersed in a fluid (gaseous or liquid) medium and to respond to changes of the temperature of the medium with corresponding changes in their electrical resistances. Typically these bulbs are intended to be supported in the wall of an enclosure within which is the fluid medium whose temperature is to be measured, for example in the wall of an engine manifold or crank-case, the sensitive or resistance-element portion proper of the bulb extending into the medium for thermal response thereto. The variations in the resistance of the element proper are translated into a suitable indication, for example visual, by any appropriate means such for example as an electrical bridge circuit of which the element may form one arm.

The wide difference of temperature which may exist, between the wall in which the bulb is supported and the fluid medium in which the sensitive portion of the bulb is immersed, tends to result in substantial error in the indication of the temperature of the medium. Constructions specifically intended to minimize this tendency, however, themselves tend markedly to increase the time lag of the device, or the delay characterizing its response to changes in the temperature of the medium. It is an object of my invention to minimize simultaneously the error and the time lag both abovementioned. And it is an object to provide a resistance thermometer bulb, adapted for such as abovementioned, whose operation is characterized by smallness of error and of time lag jointly.

For strength and ease of construction it is preferable that the well or shell of the bulb, which extends into the medium and within which the resistance element proper is contained, be made of metal, as distinguished from glass, ceramic, plastic or other non-metallic material. It is an object of my invention to fulfil the objects stated above in a device employing a metallic well or shell.

In achieving the single result of small error with metal-shell devices, recourse has at times been had to the expedient of thermally insulating the shell from the base of the bulb—i. e., from the portion immediately secured in the enclosure wall, and thus exposed to the temperature of the wall (and usually also to at least some extent to the temperature obtaining outside of the enclosure). This expedient is a troublesome one, particularly when, as is otherwise desirable, the well formed by the shell is to be hermetically sealed. It is an object of my invention to fulfil the objects above stated in a device employing a metallic shell without thermal insulation thereof from the base of the device.

It is another object to provide improved means and methods for supporting the resistance element proper within the shell of the device.

It is another object to provide improved means and methods for securing the resistance element proper to the interior of the shell.

It is another object to provide a particularly improved combination of insulation for the wire of the resistance element, and binding medium for holding the same to the shell, to result simultaneously in good heat conductivity, mechanical strength, and chemical imperviousness to deterioration.

It is another object to provide for the resistance element a wire which has both particularly favorable mechanical properties for the specific use, and a high sensitivity in respect of resistance change with temperature.

It is another object to fulfil priorly stated objects in a device adapted for the measurement of very high temperatures without harmful effect on the device.

It is another object to provide a resistance thermometer bulb particularly well adapted to withstand heavy vibration, as in airplane service.

It is another object to provide a generally improved resistance thermometer bulb.

Other and allied objects will more fully appear from the following description and the appended claims.

In the description reference is had to the accompanying drawing, in which:

Figure 1 is a cross-sectional view taken axially through a resistance thermometer bulb in which my invention is embodied;

Figure 2 is a cross-sectional view taken along the line 2—2 of Figure 1;

Figure 3 is a fractional cross-sectional view, on an enlarged scale, taken along the line 3—3 of Figure 2;

Figure 4 is an end view of the device of Figure 1, the line 1—1 in Figure 4 indicating the plane on which Figure 1 is taken; and Figure 5 is a schematic view of a typical circuit in which the device of Figures 1 through 4 may be employed.

Reference being had to the drawing, there will be seen designated as 1 the base of the bulb; this base may be formed of any convenient metal, although I have preferred to employ for it a material similar to that mentioned below for the shell 11. The central or largest-diameter portion 3 of the base may be of hexagonal shape (as seen in Figure 4) to adapt it for manipulation by a wrench in the mounting of the bulb. The base may have an externally threaded portion 2 of somewhat reduced diameter extending for a distance from the portion 3; and it will be understood that in the mounting of the bulb the base portion 2 may be screwed into a wall (such as schematically indicated as W in Figure 1), the medium whose temperature is to be measured being on one side of the wall and the central base portion 3 being exposed on the other side of the wall.

The base 1 may be centrally apertured—for example, through its portion 2 and the immediately adjacent part of portion 3, for a diameter of about or a little more than ¼ inch. Extending into and secured within this aperturing is one end portion of a shell 11, which may extend from the base portion 2 to have its free end for example almost 2 inches therefrom. This free end of the shell 11 may be closed by a disc 12 integral with or welded to the shell, the shell and disc together constituting a well which is immersed in the medium whose temperature is to be measured. Within this well is contained the resistance element proper as hereinafter more specifically described.

The base 1 of the bulb may have, extending from the central portion 3 outwardly (or oppositely to the portion 2), a reduced-diameter externally threaded portion 4; and the central aperturing of the base may be extended through the outer part of the base portion 3 and through this portion 4, preferably with an increased diameter. Onto the portion 4 may be threaded a sleeve 5. This sleeve may be provided with an internal shoulder 5a; and this shoulder may be employed to clamp, against the outer or free end of the base portion 4, a thick disc 6 of insulation—for example, of the ceramic material commonly known as "Isolantite." Preferably this clamping will be through the medium of gaskets 7 of soft metal such as aluminum, one of the gaskets being disposed between the shoulder 5a and the disc 6, and the other between that disc and the end of the base portion 4. Extending through and anchored within the disc 6, and extending outwardly therefrom within the outer portion of the sleeve 5, may be a pair of contact pins 8. The construction is adapted for the electrical contacting of pins 8 by a female plug-type connector (not shown) to be inserted within the outer portion of the sleeve 5; and the outer end of the sleeve may be threaded externally to receive the swivelling clamp or housing (not shown) commonly employed in association with such a connector. The connector may be employed with an armored cable (not shown) for connecting the pins 8—and thus the resistance element proper, which will hereinafter be seen to be connected thereacross—into an indicating circuit such as shown in Figure 5.

Attention may now be directed to the resistance element proper, and to the relationships between it and other portions of the bulb. This element is designated in the drawing as 13; it is mounted within the well of the bulb in a position which, as is common in devices of this character, preferably is substantially immediately adjacent to the internal wall of the shell and, longitudinally, is relatively nearer the free end of the shell.

As has been touched on above, the difference between the temperature of the wall (and/or the temperature external of the wall) and hence of the base of the device, and the temperature of the medium to be measured, may introduce substantial error into the temperature indications provided by the device; this is by reason of the tendency for the resistance element 13 to assume a temperature intermediate between that of the medium and that of the base. Attempts to employ devices of this type wherein such a substantial error occurs, by allowing for a fixed-percentage error in the calibration of the indicating instrument, are not particularly satisfactory at best; and they are futile if the same or similar instruments are to be used for measurements of different media (for example, air in one case, oil in another) in view of the great dependence of the degree of error on the medium. On the other hand, as has also been touched on above, not all expedients which would minimize the tendency to error are useful, as most of them tend seriously to increase the time lag with which the temperature of the element 13 will follow changes in the temperature of the medium.

I have found that for simultaneous achievement of small error and small time lag, three primary conditions must be jointly fulfilled: (a) the thermal conduction from element to base (i. e., in a direction longitudinal of the device) must be small; (b) the thermal capacity of the shell portion most immediately surrounding the element must be small; and (c) all further thermal capacity effectively associated with the element must be small. Condition (c), and condition (a) insofar as it concerns elements other than the shell, I jointly meet by causing the shell to constitute a major fraction (for example, at least ⅔ or ¾) of the entire thermal capacity effectively associated with the element, and to constitute at least a similar fraction of, and preferably substantially the entire, admittance to heat flow between element and base. Condition (b), and condition (a) insofar as it concerns the shell, I have found cannot be satisfactorily met with glass, ceramic or other non-metallic materials; for while they facilitate compliance with (a), they are unsatisfactory, when employed with wall thicknesses sufficient for mechanical ruggedness, in complying with (b). On the other hand I have found that these two conditions cannot be satisfactorily met with the metals commonly employed for bulb-shells; for while in practicably thin wall thicknesses they facilitate compliance with (b), their relatively high thermal conduction precludes a satisfactory compliance with (a). I have found, however, that if the shell preponderates in controlling the thermal capacity associated with the element and the heat conduction from element to base, as abovementioned, and further is constructed with a very thin wall of a metallic alloy having a thermal conductivity of the order of .07 calorie per degree C. per square cm. per cm. per second, or less, then surprisingly small error and time lag can be jointly attained. At the same time the device is thoroughly rugged mechanically, is adapted to very simple manufacture, and avoids any necessity for thermal insulation interposed between shell and base.

To cause the shell to constitute the indicated fractions of the entire thermal capacity effectively associated with the element 13 and of the total admittance to heat flow between element and base, the element 13 is formed as a cylindrical winding, of insulated resistance wire, substantially fitting the bore of the shell 11, and internally supported only by a thin flat plate or card 18 of insulating material such as mica. This card 18 will be seen to extend for substantially the entire length of the shell 11, and permissibly to extend slightly from the end of the shell within the base 1. The extremely low heat conductivity of such material, and the small thermal capacity (of its portion within and near the element 13) attendant on its thinness and planar configuration, insure the stated predominance of the shell in determining the total admittance and entire thermal capacity above mentioned.

The card 18 may be of a width to substantially fit the bore of the shell 11 excepting in the longitudinal portion 18a intended to accommodate the winding, where the card may be narrowed on each side by the thickness of the insulated wire 14. The winding may be formed in place on the card with the aid of an axially split mandrel; the ends of the wire 14 may be fed through holes such as 18b in the card; and from points 14a of electrical junction with those ends, conductive leads 15 may be fed through appropriate anchoring holes 18c in the card up into the bore of the base 1, for final electrical connection with the respective pins 8. After the formation of the winding and its equipment with the anchored leads 15, the card and winding and mandrel may be slipped together into the well, and the mandrel then removed.

Before the abovementioned insertion of the card 18, the shell 11 may be tightly fitted within the bore of the base 1, and will preferably be silver-soldered or otherwise intimately secured to the base. The alloy of low thermal conductivity which I have preferred to employ for the shell 11 is stainless steel (for example, "18-8", containing 18% chromium and 8% nickel), which has a thermal conductivity of approximately .052 calorie per degree C. per square cm. per cm. per second—although other alloys having a thermal conductivity of the order of .07 (in the same units) or less may satisfactorily be employed. I have employed the stainless steel material abovementioned in a wall thickness of the order of .012 inch. With this thickness, and with the winding or element 13 placed at an average distance of about 1⅛ inches from the base 1 (as I have placed it), the thermal conduction through the shell from element to base is only about .0011 calorie per degree C. per second. By way of comparison of these figures with those for commonly employed metals, it may be pointed out that they are less than ⅛th of those for pure aluminum, and of the order of ⅙th of these for the most common aluminum alloys. Observations have shown the errors with my device to be of the general order of only 6% (of the temperature difference between medium and base) in measurement of an air medium and .045% in measurement of an oil medium, as contrasted with about 33% and 4%, for air and oil respectively, with an otherwise similar device having a shell of one of these common aluminum alloys. At the same time my device, on sudden immersion in a new medium temperature, responded with 90% of its ultimate temperature change indication at the expiration of a lag of only 16 seconds—of which tests have shown the element 13 itself to be responsible for about 2 seconds, the card 18 to be responsible for about 3 seconds, and the shell 11 to be responsible for about 11 seconds (or over ¾ of the total lag caused by card and shell).

It will of course be understood that the wall thickness and/or thermal conductivity of the shell may be varied to some extent from the specific examples given above; but in choosing them I prefer to keep the thermal conduction through the shell between element and base at least as low as approximately .0015 calorie per degree C. per second.

Both for imperviousness to the effects of high temperature, and for its special adaption to the binding medium hereinafter mentioned, I prefer to employ a resistance wire 14 which is insulated with a glass fibre wrapping—i. e., with a single or preferably a double serving of glass fibre over the wire. To secure a particularly intimate thermal bond of the element 13 to the interior wall of the well, I have employed a sodium silicate binding medium. This I have done by making a saturated solution of pure hydrated sodium silicate, or $Na_2SiO_3(9H_2O)$, applying this to the installed winding, and curing by baking, to drive off water and moisture of combination, at a temperature slowly raised up to or beyond 600 degrees F. While a sodium silicate binding medium is broadly well known, I have found that its described use with the glass-insulated wire results in a structure wherein the wire becomes imbedded in, and united to the shell through, an almost-homogeneous sheath (formed apparently because of a large measure of amalgamation of the binding medium with the glass insulation, to which it has basically similar characteristics) which not only has the good heat-conducting properties of sodium silicate, but at the same time has a particularly favorable mechanical strength and resistance to vibration, and imperviousness to chemical and thermal disintegration. The enlarged Figure 3 illustrates at 16 the sheath just described.

While I prefer to employ the sodium silicate binding medium as above described, to bond the element 13 to the shell 11, I may if desired, and with only a relatively minute increase in the time lag of the device, omit this bonding in view of the substantial fitting of the element within the shell. In such a case I prefer, however, still to employ the sodium silicate theatment (application and curing) for the winding before its insertion into the shell, thereby still retaining all of the described advantages of the treatment as to the element 13 considered apart from the shell.

The curing process for the sodium silicate binding medium applied to the element 13 in place in the shell is of course carried out before the final installation of the disc 6 and tightening of the sleeve 5. At its conclusion (or at the conclusion of a special de-hydrating heating of the device if that curing process is not carried out), I permit the device to cool in a dry atmosphere; and then, without affording any opportunity for the re-acquisition of moisture, I clamp the disc 6 by the sleeve 6 through gaskets 7 as above described, thus hermetically sealing the interior of the device. Thereafter the sleeve 5 may be held against loosening movement by a pin 9 passed through the sleeve into biting engagement with the base portion 4.

The choice of the material of the resistance wire 14 itself will of course be made according to the resistance-change requirements which it is desired that the device meet. To obtain a high degree of sensitivity, however, I have very satisfactorily employed wire of a material commonly known as "Kovar"—an alloy consisting of 29% nickel, 17% cobalt, 0.2% manganese, and the balance iron. This alloy is specially calculated for similarity of its thermal expansion coefficient with that of glass or similar materials; and it may be noted that the element 13 formed of it in the sheath 16 above described is therefore particularly free of temperature-induced mechanical strains.

This wire as commercially available neither is characterized by the full resistance-temperature coefficient of which it is capable, nor is its coefficient entirely stable. I have found that its resistance-temperature coefficient may be raised and at the same time renderd perfectly stable, by suitably annealing the wire in an atmosphere of dry hydrogen—more specifically, by bringing it up in such an atmosphere in a furnace to a temperature over 900 degrees C., and preferably between 925 and 950 degrees; keeping it at that temperature for a time, for example a half-hour; and allowing it to cool slowly in that atmosphere with the furnace. The temperature to which it is to be raised in this process is rather critical; no worthwhile effect is noted below 900 degrees; and a slight measure of control of the ultimate coefficient may be had by controlling the temperature within the preferred range of 925 to 950 degrees (higher temperature tending to higher coefficient). With this treatment a coefficient yielding the following series of values is readily achieved: 81.6 ohms at —50 degrees C.; 100 ohms at 0 degrees; 140.5 at 100 degrees; 173.2 at 180 degrees.

It will of course be understood that slight adjustments both of the mean absolute resistance and of the resistance-temperature coefficient of the device, as seen between the pins 8, may be effected by suitable choice of the material and dimensions of the conductive leads 15 and of the precise length of resistance wire in the element 13.

Figure 5 illustrates a typical employment of the device of earlier figures. The device appears herein in its entirety as 20, being connected between two terminals 21 and 22 of a triple-contact receptacle 24. A battery or other current source B is connected between one of these terminals (22) and a third terminal 23. The terminals 21 and 22, and therethrough the device 20, are connected to form one of the arms of a Wheatstone bridge, whose other arms are schematically shown as 25, 26 and 27. The terminals 22 and 23, and therethrough the battery B, are connected in one diagonal path across the bridge, while an indicating device or meter M is connected across the other diagonal path. The bridge being balanced as desired at some one temperature of the element 13 in the device 20, the meter M will thereafter indicate the deviations from that temperature.

It will be understood that while in describing my invention I have referred to various dimensional characteristics, these, excepting when indicated to be essential, are intended as exemplary only. Likewise while I have illustrated and described a particular embodiment of the invention, many of the details of that embodiment may be materially modified without departure from the true spirit or scope of the invention. That scope I undertake to define in the appended claims.

I claim:

1. In a resistance bulb adapted for the electrical measurement of the temperature of a fluid medium and having a metallic supporting base adapted to be secured in and thermally influenced by an element of substantially different temperature from said medium: the combination of a thin shell secured to said base in thermally conductive relationship thereto and extending from said base for immersion in said medium, and a temperature-variable resistance element within a portion of said shell spaced from said base, said shell constituting the principal thermal capacity effectively associated with said element and the principal path for heat conduction from said element to said base, and being formed of a metallic material having a thermal conductivity at most of the order of .07 calorie per degree centigrade per square centimeter per centimeter per second.

2. In a resistance bulb adapted for the electrical measurement of the temperature of a fluid medium and having a metallic supporting base adapted to be secured in and thermally influenced by an element of substantially different temperature from said medium: the combination of a thin shell secured to said base in thermally conductive relationship thereto and extending from said base for immersion in said medium, and a temperature-variable resistance element within a portion of said shell spaced from said base, said shell constituting the principal thermal capacity effectively associated with said element and the principal path for heat conduction from said element to said base, and being formed of a metallic material having a thermal conductivity of the order of .05 calorie per degree centigrade per square centimeter per centimeter per second.

3. In a resistance bulb adapted for the electrical measurement of the temperature of a fluid medium and having a metallic supporting base adapted to be secured in and thermally influenced by an element of substantially different temperature from said medium: the combination of a metallic shell secured to said base in thermally conductive relationship thereto and extending from said base for immersion in said medium, and a temperature-variable resistance element within a portion of said shell spaced from said base, said shell constituting the principal thermal capacity effectively associated with said element and the principal path for heat conduction from said element to said base, and the portion of said shell between said element and said base being characterized by a longitudinal thermal conduction at most of the order of .0015 calorie per degree centigrade per second.

4. In a resistance bulb adapted for the electrical measurement of the temperature of a fluid medium and having a metallic supporting base adapted to be secured in and thermally influenced by an element of substantially different temperature from said medium: the combination of a metallic shell secured to said base in thermally conductive relationship thereto and extending from said base for immersion in said medium, and a temperature-variable resistance element within a portion of said shell spaced from said base, said shell constituting the principal path for heat conduction from said element to said base, and the principal thermal capacity effectively associated with said element, and the portion of said shell between said element and said base being characterized by a longitudinal thermal conduction of the order of .0011 calorie per degree centigrade per second.

5. The combination according to claim 1, wherein said shell constitutes at least two-thirds of the thermal capacity associated with said element.

6. The combination according to claim 1, wherein said shell constitutes at least two-thirds of the admittance to heat flow between said element and said base.

7. In a resistance bulb adapted for the electrical measurement of the temperature of a fluid medium and having a metallic supporting base adapted to be secured in and thermally influenced by an element of substantially different temperature from said medium: the combination of a thin shell secured to said base in thermally conductive relationship thereto and extending from said base for immersion in said medium, and a temperature-variable resistance element within a portion of said shell spaced from said base, said shell constituting the sole metallic support of said element and the principal thermal capacity effectively associated with said element, and being formed of a metallic alloy having a thermal conductivity at most of the order of .07 calorie per degree centigrade per square centimeter per centimeter per second.

8. In a resistance bulb adapted for the electrical measurement of the temperature of a fluid medium and having a metallic supporting base adapted to be secured in and thermally influenced by an element of substantially different temperature from said medium: the combination of a metallic shell secured to said base in thermally conductive relationship thereto and extending from said base for immersion in said medium, and a temperature-variable resistance element within a portion of said shell spaced from said base, said shell constituting the sole metallic support of said element and the principal thermal capacity effectively associated with said element, and being characterized, in its portion between said element and said base, by a longitudinal thermal conduction at most of the order of .0015 calorie per degree centigrade per second.

FREDERICK G. KELLY.